(12) United States Patent
Sun

(10) Patent No.: US 7,792,370 B2
(45) Date of Patent: Sep. 7, 2010

(54) RESIDUAL COLOR TRANSFORM FOR 4:2:0 RGB FORMAT

(75) Inventor: Shijun Sun, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1573 days.

(21) Appl. No.: 10/907,080

(22) Filed: Mar. 18, 2005

(65) Prior Publication Data

US 2006/0210155 A1 Sep. 21, 2006

(51) Int. Cl.
G06K 9/36 (2006.01)
G06K 9/00 (2006.01)
(52) U.S. Cl. .................. 382/232; 382/162; 348/272
(58) Field of Classification Search .......... 382/162, 382/166, 232–253, 298–300; 348/272–280
See application file for complete search history.

(56) References Cited

U.S. PATENT DOCUMENTS

| 6,975,354 | B2 * | 12/2005 | Glotzbach et al. | 348/273 |
| 7,002,627 | B1 * | 2/2006 | Raffy et al. | 348/273 |
| 7,139,022 | B1 * | 11/2006 | Raffy | 348/273 |
| 2003/0185439 | A1 | 10/2003 | Malvar | |
| 2006/0083432 | A1 | 4/2006 | Malvar | |

FOREIGN PATENT DOCUMENTS

JP 2005-160108 A 6/2005

* cited by examiner

*Primary Examiner*—Manav Seth
(74) *Attorney, Agent, or Firm*—Krieger Intellectual Property, Inc.; Scott C. Krieger

(57) ABSTRACT

A Residual Color Transform (RCT) technique directly encodes 4:2:0 Red-Green-Blue (RGB) data without data loss prior to compression. After transmission or storage, the coded 4:2:0 RGB data is directly decoded and interpolated to generate missing RGB data prior to display.

15 Claims, 7 Drawing Sheets

| B | G | B | G |
|---|---|---|---|
| G | R | G | R |
| B | G | B | G |
| G | R | G | R |

PRIOR ART
FIG. 3

RESIDUAL COLOR TRANSFORM FOR 4:2:0 RGB FORMAT

CROSS-REFERENCE TO RELATED APPLICATION

The present patent application is related to U.S. patent application entitled "Video Compression For Raw RGB Format Using Residual Transform," invented by Shawmin Lei and Shijun Sun, U.S. Pat. Ser. No. 10/907,082, which is filed concurrently herewith and incorporated by reference herein.

BACKGROUND OF THE INVENTION

1. Field of the Invention

The present invention relates to video coding. In particular, the present invention relates to a system and a method for encoding 4:2:0 Red-Green-Blue (RGB) video data.

2. Description of the Related Art

Residual Color Transform (RCT) is a coding tool for the H.264 High 4:4:4 profile that is intended to be used for efficient coding of Red-Green-Blue-format (RGB-format) video sequences. FIGS. 1 and 2 illustrate the difference between a conventional video coding system that does not use the RCT coding tool and a conventional video coding system that uses the RCT coding tool. Details regarding the encoding and decoding, and the prediction and compensation loops are not shown in either of FIGS. 1 or 2.

FIG. 1, in particular, depicts a high-level functional block diagram of a conventional video coding system 100 that does not use the RCT coding tool. Conventional video coding system 100 captures Red-Green-Blue (RGB) data in a well-known manner at 101. At 102, the RGB data is converted into a YCbCr (or YCoCg) format. At 103, intra/inter prediction is performed on the YCbCr-formatted (or YCoCg-formatted) data. A spatial transform is performed at 104 and quantization is performed at 105. Entropy encoding is performed at 106. The encoded data is transmitted and/or stored, as depicted by channel/storage 107. At 108, the encoded data is entropy decoded. At 109, the entropy-decoded data is dequantized. An inverse-spatial transform is performed at 110, and intra/inter compensation is performed at 111. At 112, the resulting YCbCr-formatted (or YCoCg-formatted) data is transformed to RGB-based data and displayed at 113.

FIG. 2 depicts a high-level functional block diagram of a conventional video coding system 200 that uses the RCT coding tool for the H.264 High 4:4:4 profile. Video coding system 200 captures RGB data in a well-known manner at 201. At 202, intra/inter prediction is performed on the RGB data. At 203, the intra/inter-predicted data is converted into a YCbCr (or YCoCg) format. A spatial transform is performed at 204 and quantization is performed at 205. Entropy encoding is performed at 206. The encoded data is transmitted and/or stored, as depicted by channel/storage 207. At 208, the encoded data is entropy decoded. At 209, the entropy-decoded data is dequantized. An inverse-spatial transform is performed on YCbCr-formatted (or YCoCg-formatted) data at 210. At 211, the YCbCr-based data is transformed to RGB-based data. At 212, intra/inter compensation is performed, and RGB-based data is displayed at 213.

The difference between conventional video coding system 100 (FIG. 1) and conventional video coding system 200 (FIG. 2) is that the RCT coding tool of system 200 enables compression and decompression directly to and from the RGB space. To illustrate this, compression directly in the RGB space is depicted in FIG. 2 by the sequence of functional blocks 202-204. In particular, intra/inter prediction is performed on the RGB data at 202. The intra/inter-predicted data is converted into a YCbCr (or YCoCg) format at 203. A spatial transform is performed at 204. Decompression directly from the RGB space is depicted in FIG. 2 by the sequence of functional blocks 210-212. At 210, an inverse-spatial transform is performed on YCbCr-formatted (or YCoCg-formatted) data at 210. At 211, the YCbCr-formatted data is transformed to RGB-based data. At 212, intra/inter compensation is performed at 111.

In contrast, the corresponding compression process in conventional video coding system 100 is depicted by functional blocks 102-104. At 102, RGB data is converted into a YCbCr (or YCoCg) format. Intra/inter prediction is performed on the YCbCr-formatted (or YCoCg-formatted) data at 103, and a spatial transform is performed at 104. The corresponding decompression process is depicted by functional blocks 110-112 in which an inverse spatial transform is performed at 110. Intra/inter compensation is performed at 111. Lastly, the YCbCr (or YCoCg) data is transformed to RGB-based data at 112.

The color conversion in RCT at 203 in FIG. 2, as an RGB-based format to a YCoCg-based format, is inside the typical coding loop, and can be considered as an extension of a conventional transform coding from a 2D spatial transform to a 3D transform (2D spatial+1D color), but, with the same purpose of all transform coding, that is, data decorrelation and energy compaction and, consequently, easier compression. Significant improvements in rate distortion performance over a conventional coding scheme have been achieved for all three RGB color components, as demonstrated in an updated version of the RCT algorithm.

The main challenge for RCT, as RCT is applied in practice, does not related to compression, but relates to video capture and display. Moreover, most video-capture and video-display devices currently do not support the RGB format not because extra hardware and software resources are needed internally to convert data from RGB-based data but based on the bandwidth requirements for the 4:4:4 RGB format.

For a single-chip-color-sensor digital video camera, each pixel actually has only one color component. FIG. 3 depicts a typical Bayer mosaic filter, which is used for most of the popular primary-color-mosaic sensors. As depicted in FIG. 3, the Green (G) sensors, or filters, cover 50% of the pixels, while the Blue (B) and Red (R) sensors, or filters, each cover 25% of the pixels. Because each pixel position has only one color component, the other two color components must be interpolated, or generated, based on existing samples. The interpolation process is a simple 1:3 data expansion.

FIG. 4 depicts a high-level functional block diagram of a conventional video coding system 400 that provides a lossy color conversion, such as from RGB to YCbCr. At 401, RGB sensors perform RGB capture. At 402, a 1:3 interpolation process is performed for generating missing color components. At 403, color conversion and a lossy 2:1 subsampling is performed for generating 4:2:0 YCbCr data. Thus, the overall process up to functional block 404 results in a lossy 1:1.5 data expansion before the 4:2:0 YCbCr data is compressed, i.e., video coded. The encoded data is transmitted and/or stored, as depicted by channel/storage 405. The video coded data is then decoded at 406. Color up-sampling and color conversion occurs at 407, and the resulting data is RGB displayed at 408.

Consequently, what is needed is a residual color transformation (RCT) coding tool for a 4:2:0 RGB format in which compression is performed directly on 4:2:0 RGB without data loss prior to compression.

SUMMARY OF THE INVENTION

The present invention provides a residual color transformation (RCT) coding technique for a 4:2:0 RGB format in which compression is performed directly on 4:2:0 RGB without data loss prior to compression.

The present invention provides a Residual Color Transform (RCT) coding method for 4:2:0 Red-Green-Blue (RGB) data in which RGB data is interpolated to generate at least one missing Green color component to form 4:2:0 RGB data and then directly encoded. According to the present invention, video encoding of the 4:2:0 RGB data encodes the 4:2:0 RGB data without data loss. Additionally, interpolating RGB data includes using a 1:1.5 expansion technique. More specifically, directly encoding the 4:2:0 RGB-based data includes subsampling an 8×8 Green residual to form a single 4×4 Green residual and then converting the 4×4 Green residual, a corresponding 4×4 Red residual and a corresponding 4×4 Blue residual to YCoCg-based data. The YCoCg-based data is 4×4 transformed and quantized to form YCoCg coefficients. The YCoCg coefficients are then coded into a bitstream.

Coding the YCoCg coefficients into the bitstream further includes dequantizing the YCoCg coefficients and inverse 4×4 transforming the dequantized YCoCg coefficients to reconstruct the YCoCb-based data. The YCoCg-based data is converted to RGB-based data to form 4×4 G residual data. The 4×4 G residual data is reconstructed and 2×2 up-sampled to form an 8×8 G residual prediction. A 2nd-level 8×8 Green residual is formed based on a difference between the 8×8 G residual prediction and the 8×8 Green residual. The 2nd-level 8×8 Green residuals is transformed by a 4×4 transformation or an 8×8 transformation and quantized to form Green coefficients. The Green coefficients are then coded into the bitstream. After storage and/or transmission, the encoded 4:2:0 RGB data is directly decoded and interpolating for generating at least one of a missing Blue color component and a missing Red color component prior to display.

The present invention also provides a method of entropy decoding the bitstream to form YCoCg coefficients, de-quantizing the YCoCg coefficients, inverse-transforming the de-quantized YCoCg coefficients to form an 8×8 Green residual prediction and 4×4 Red and Blue residuals, and forming an 8×8 Green residual from the 8×8 Green residual prediction. According to the invention, forming the 8×8 Green residual from the 8×8 Green residual prediction includes entropy decoding the bitstream to form Green coefficients, de-quantizing the Green coefficients to form an 8×8 Green residual, inverse-transforming the dequantized Green coefficients to form a 2nd-level 8×8 Green residual, and combining the 2nd-level 8×8 Green residual with the 8×8 Green residual prediction to form the 8×8 Green residual.

The present invention also provides a video coding system that directly codes 4:2:0 RGB data using a RCT coding tool by interpolating RGB data to generate at least one missing Green color component to form 4:2:0 RGB data and then directly encoding the 4:2:0 RGB-based data. The system video encodes the 4:2:0 RGB data without data loss. The system also directly decodes the encoded 4:2:0 RGB data, and interpolates the decoded 4:2:0 RGB data for generating missing at least one of a Blue color component and a Red color component prior to display.

The system includes a sub-sampler sub-sampling an 8×8 Green residual to form a single 4×4 Green residual, a converter converting the 4×4 Green residual, a corresponding 4×4 Red residual and a corresponding 4×4 Blue residual to YCoCg-based data, a transformer 4×4 transforming the YCoCg-based data, a quantizer quantizing the 4×4 transformed YCoCg-based data to form YCoCg coefficients, and an entropy coder coding the YCoCg coefficients into a bitstream. The system also includes a dequantizer dequantizing the YCoCg coefficients, an inverse transformer inverse 4×4 transforming the dequantized YCoCg coefficients to reconstruct the YCoCb-based data, a converter converting the YCoCg-based data to RGB-based data, a reconstructor reconstructing 4×4 G residual data, an up-sampler 2×2 up-sampling the 4×4 G residual data to form an 8×8 G residual prediction, a differencer forming a 2nd-level 8×8 Green residuals based on a difference between the 8×8 G residual prediction and the 8×8 Green residuals, a second transformer transforming the 2nd-level 8×8 Green residuals by one of a 4×4 transformation and an 8×8 transformation, and a second quantizer quantizing the transformed 2nd-level 8×8 Green residual to form Green coefficients. The entropy coder further codes the Green coefficients into the bitstream.

The present invention also provides a decoder that includes a entropy decoder that entropy decodes the bitstream to form YCoCg coefficients, a first de-quantizer that de-quantizes the YCoCg coefficients, a first inverse-transformer that inverse-transforms the de-quantized YCoCg coefficients to form an 8×8 Green residual prediction and 4×4 Red and Blue residuals, and a residual former that forms an 8×8 Green residual from the 8×8 Green residual prediction. Additionally, the entropy decoder entropy decodes the bitstream to form Green coefficients. The residual former includes a second de-quantizer that de-quantizes the Green coefficients to form an 8×8 Green residual, a second inverse-transformer that inverse-transforms the dequantized Green coefficients to form a 2nd-level 8×8 Green residual, and a combiner that combines the 2nd-level 8×8 Green residual with the 8×8 Green residual prediction to form the 8×8 Green residual.

BRIEF DESCRIPTION OF THE DRAWINGS

The present invention is illustrated by way of example and not by limitation in the accompanying figures in which like reference numerals indicate similar elements and in FIG. 1 depicts a high-level functional block diagram of a conventional video coding system that does not use the RCT coding tool;

Figure 3:
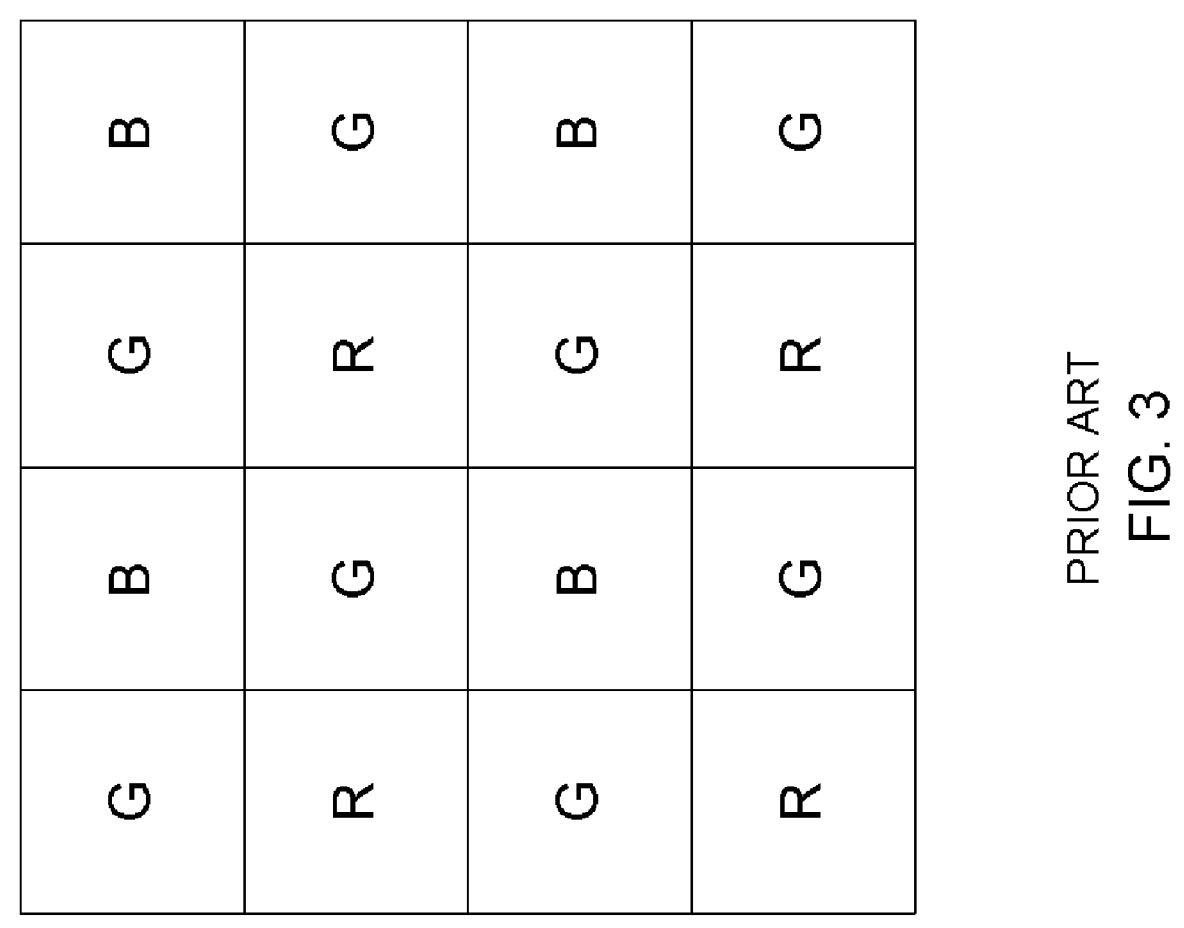

FIG. 3 depicts a typical Bayer mosaic filter, which is used for most of the popular primary-color-mosaic sensors;

DETAILED DESCRIPTION OF THE PRESENT INVENTION

The present invention provides a Residual Color Transform (RCT) coding tool for 4:2:0 RGB in which compression is performed directly on 4:2:0 RGB without data loss prior to compression.

Figure 5:
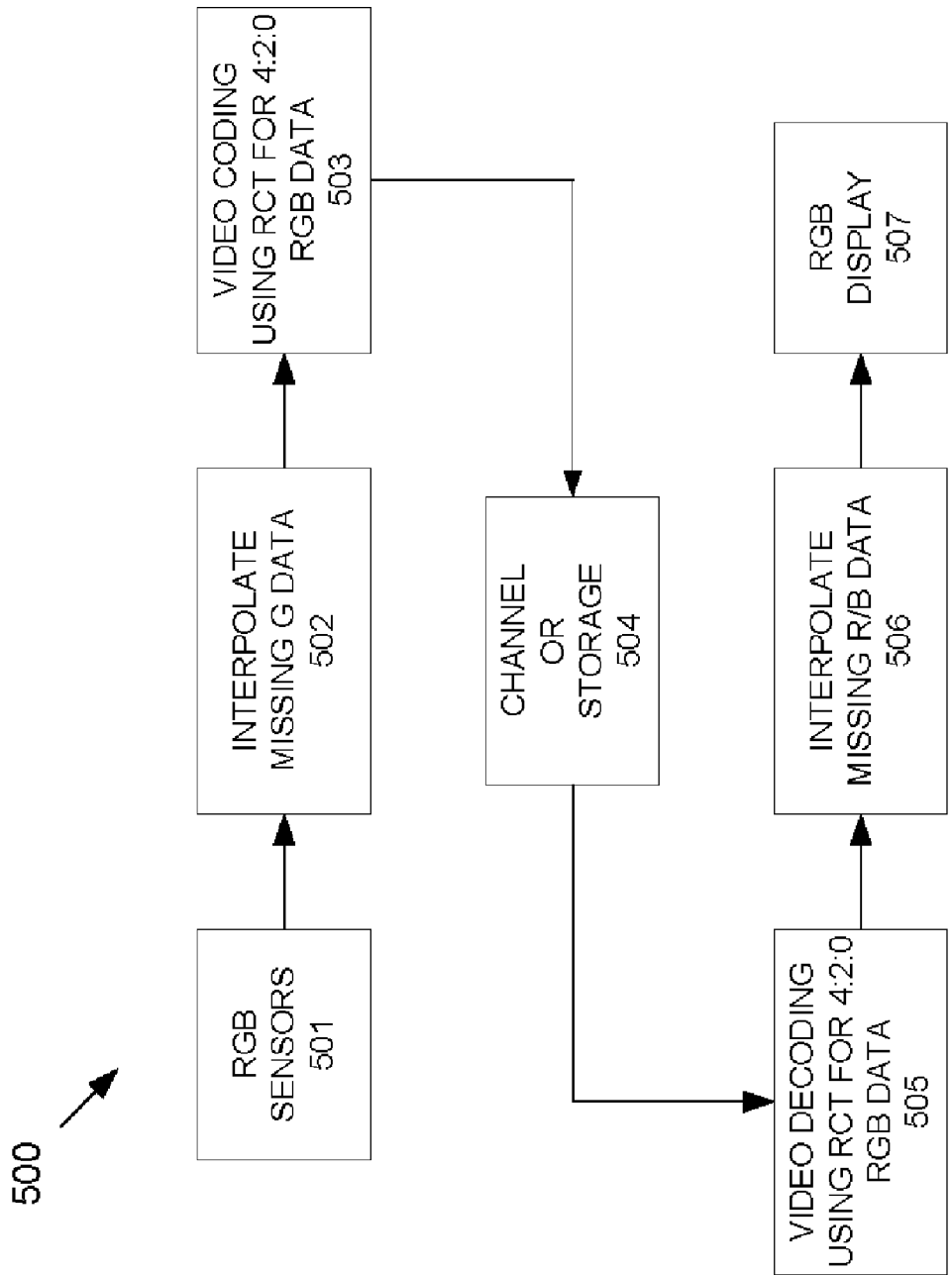
FIG. 5 depicts a high-level block diagram of a video coding system according to the present invention.

FIG. 5 depicts a high-level block diagram of a video coding system according to the present invention. In particular, RGB sensors perform RGB capture in a well-known manner at 501. Interpolation and generation of missing Green data is performed at 502 using a 1:1.5 expansion. As a result, the full resolution Green data and the original Blue and Red data together form the 4:2:0 RGB data. The encoding process at 503 operates directly on the 4:2:0 RGB data using the RCT coding tool. The sampling positions of the RGB data are different within each pixel and the positions can change from picture to picture. Consequently, the R/B sampling positions are signaled in the bitstream at sequence and/or each picture and are then used for motion vector interpolation and final display rendering. For example, a zero-motion motion compensation for R/B might actually correspond to a non-zero motion in G.

The encoded 4:2:0 RGB data is then transmitted and/or stored, as depicted by channel/storage 504. The decoding process operates directly on the 4:2:0 RGB data at 505. At 506, interpolation is performed for generating missing Blue and Red color components. The resulting data is RGB displayed at 507.

Interpolation for the Blue and Red color components (functional block 506) is deferred in the present invention until the bitstreams have been decoded. Additionally, it should be noted that the Blue and Red color component interpolation (functional block 506) could be part of a post-processing for video decoding at 505 or part of a preprocessing for RGB display at 507.

Figure 1:
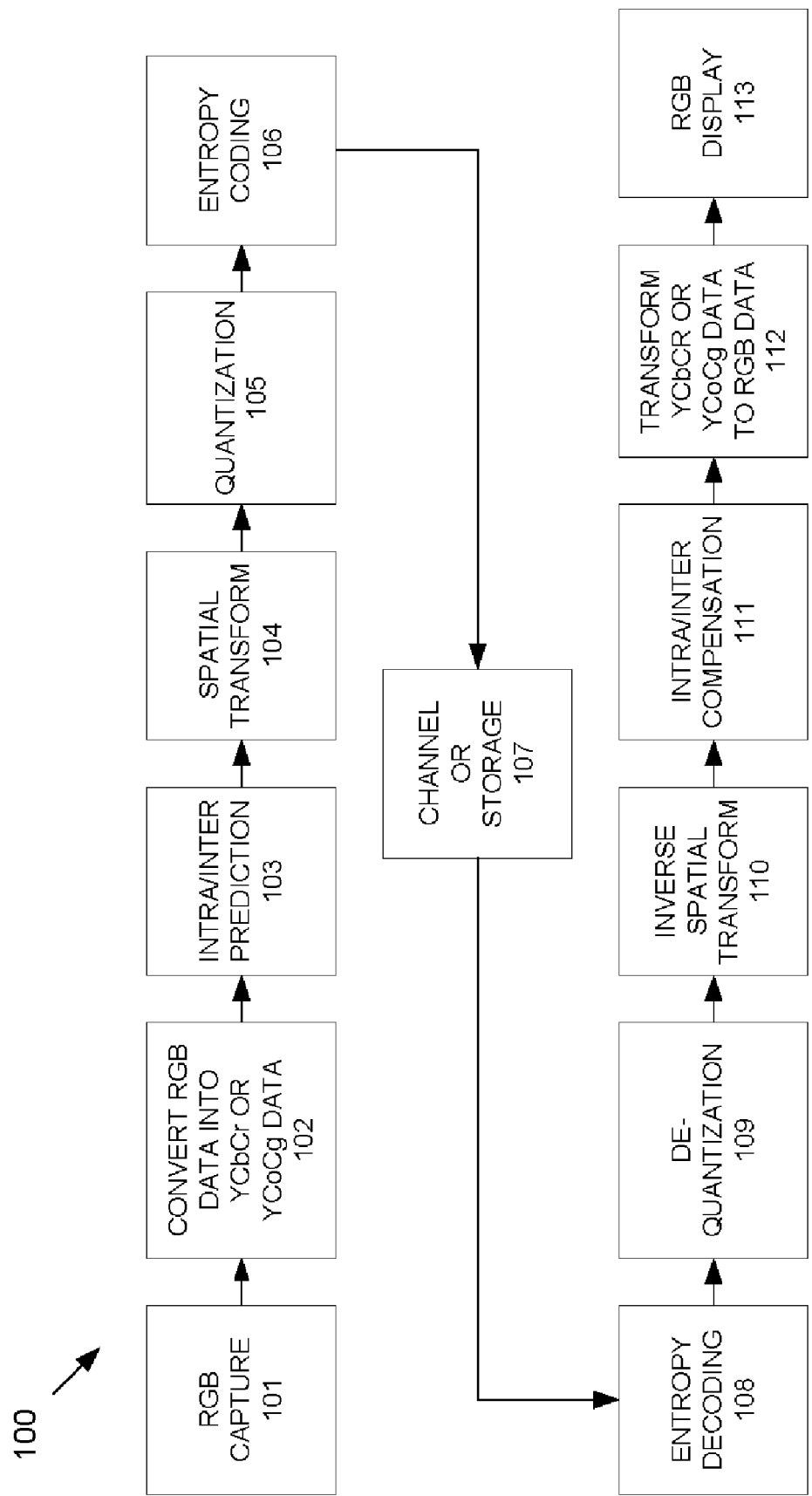
Figure 2:
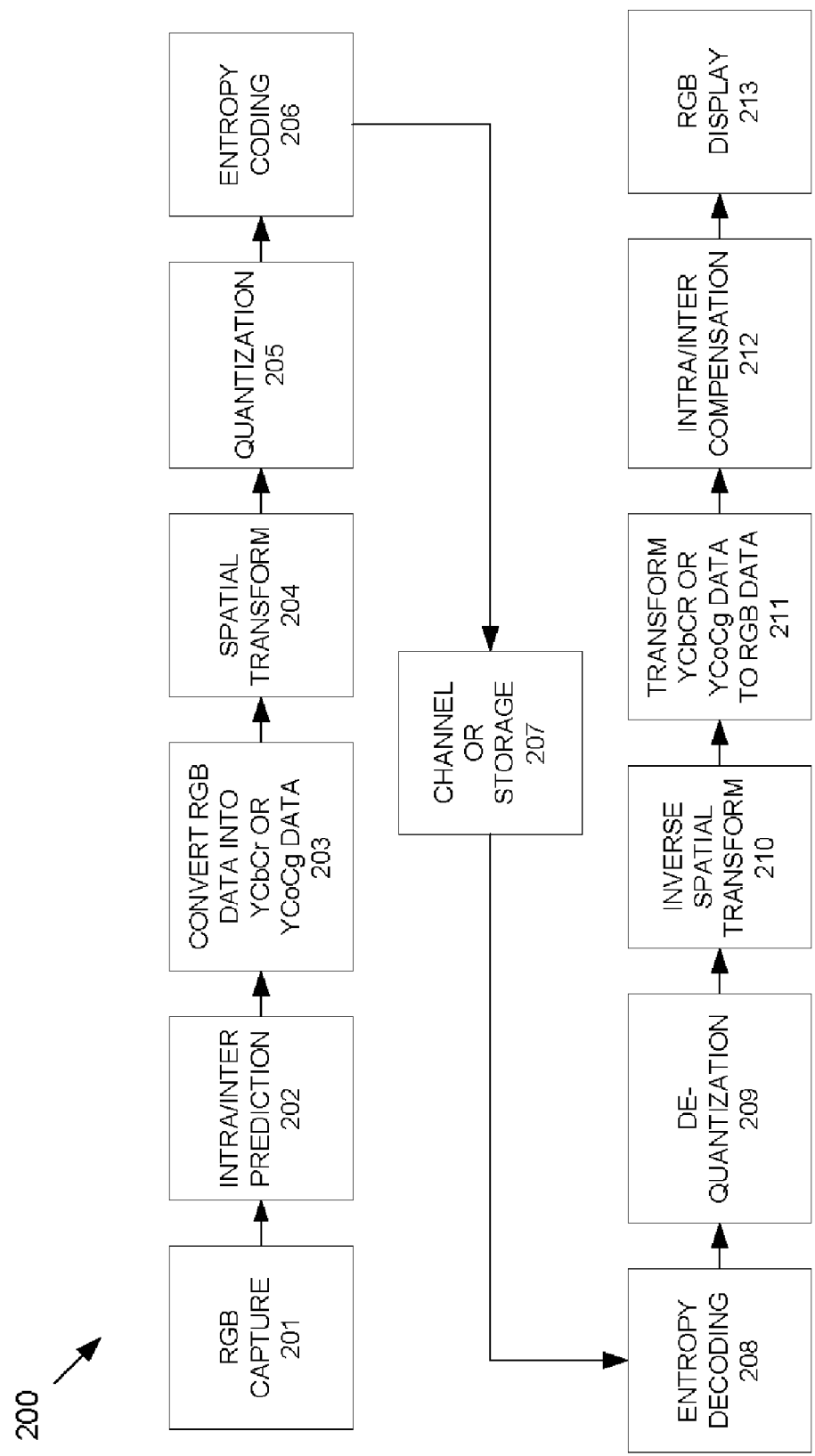
FIG. 2 depicts a high-level functional block diagram of a conventional video coding system that uses the RCT coding tool for the H.264 High 4:4:4 profile.
Figure 4:
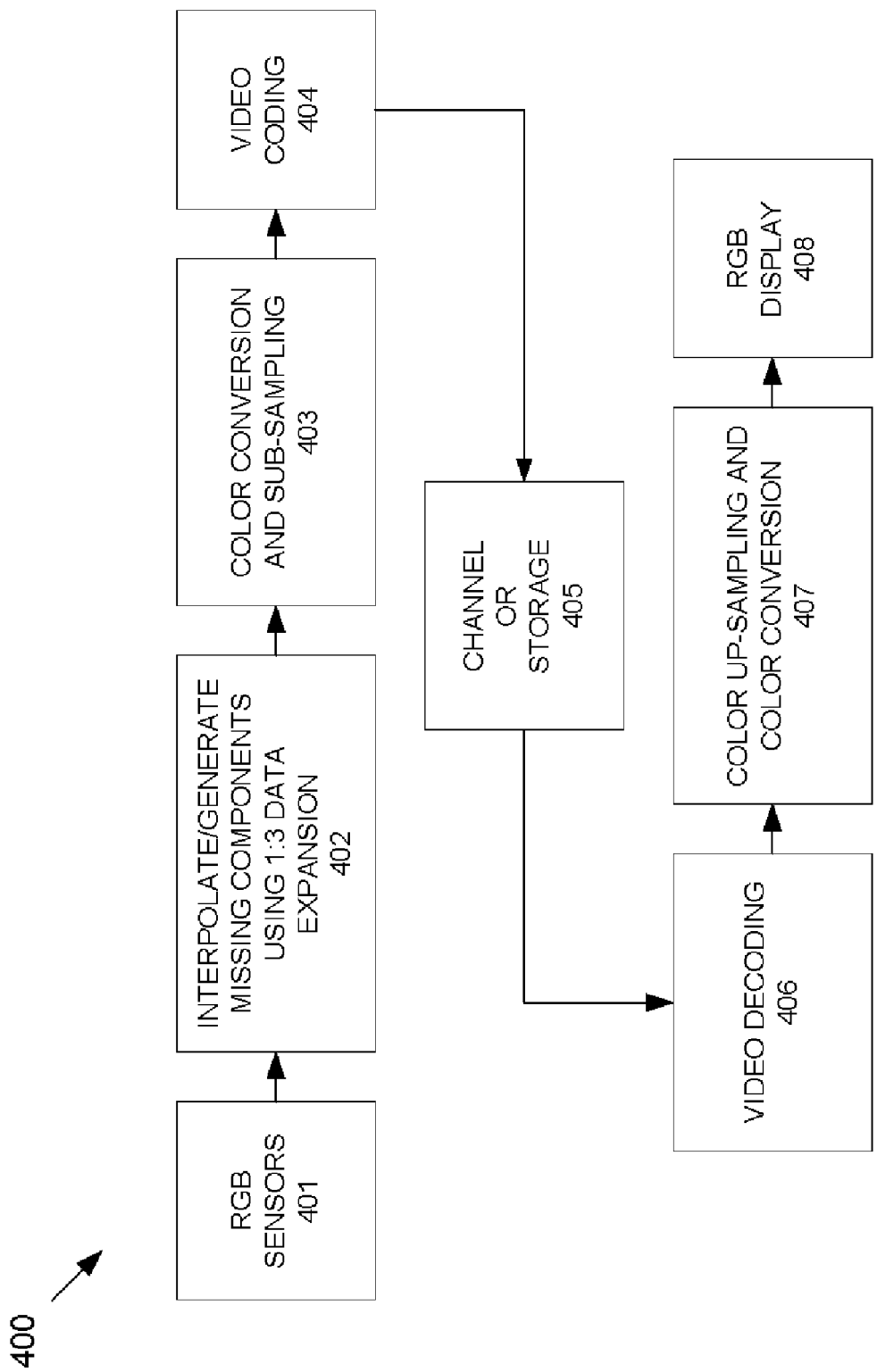
FIG. 4 depicts a high-level functional block diagram of a conventional video coding system that provides a lossy color conversion, such as from RGB to YCbCr.
Figure 6:
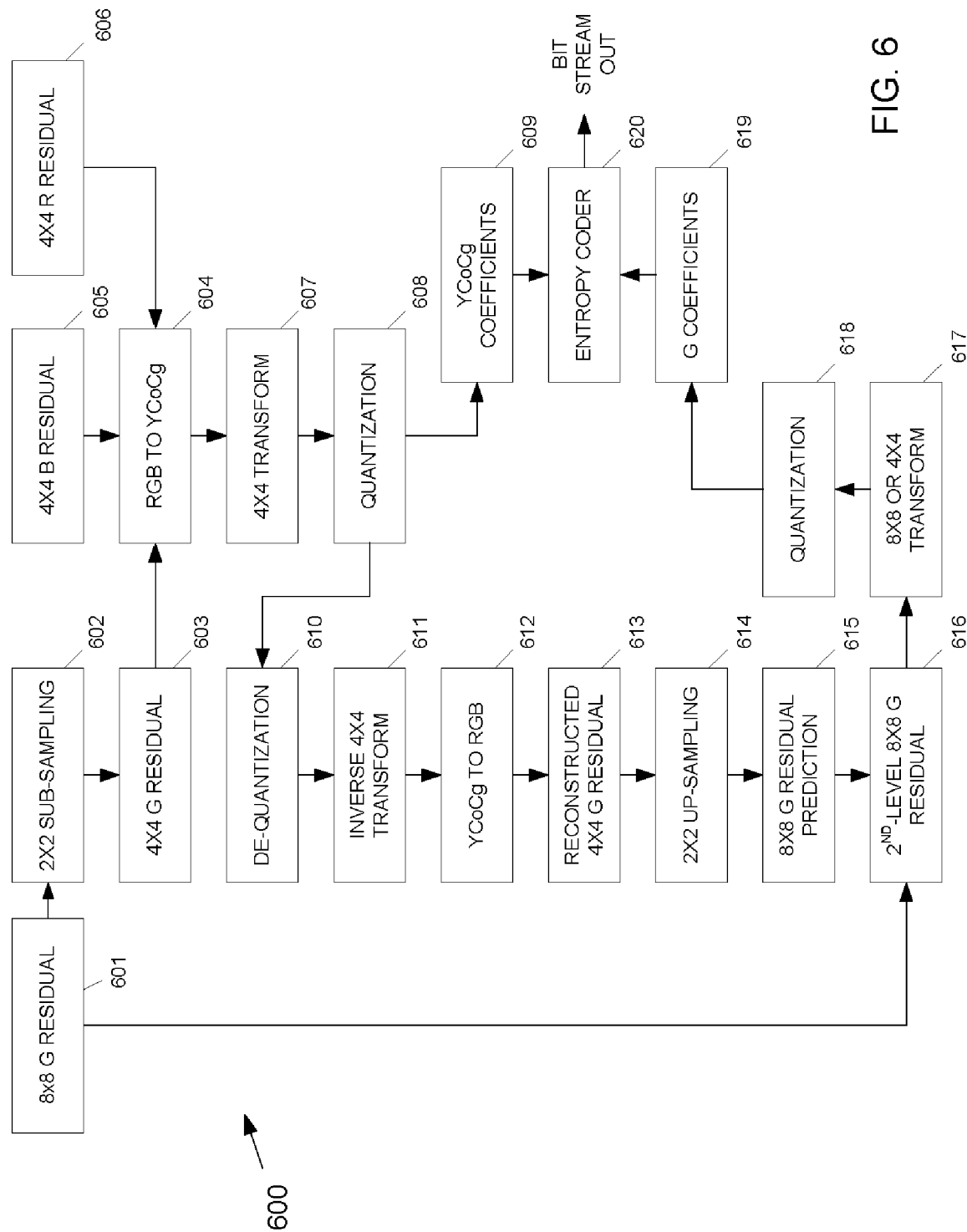
FIG. 6 shows a flow diagram of a residual encoding technique using RCT for 4:2:0 RGB data according to the present invention.

FIG. 6 shows a flow diagram 600 of a residual encoding technique according to the present invention using RCT for 4:2:0 RGB data. A block diagram for a residual encoder corresponding to the residual encoding technique of FIG. 6 has not been included because such a block diagram would be nearly identical to FIG. 6. Flow diagram 600 corresponds to the second part of processes that occur in block 503 in FIG. 5, which also includes as its first part of processes Intra/Inter Prediction, which is similar to block 202 in FIG. 2 except that the Prediction is done in the present invention based on raw RGB data, not on grid-pattern RGB data. Thus, the process depicted in FIG. 6 corresponds only to the residual coding, including transforms (spatial and RCT), quantization, and entropy coding modules. Prediction and motion compensation are done in the RGB domain and are not depicted in FIG. 6. Block 601 in FIG. 6 represents the 8×8 block of Green (G) prediction residuals that are obtained from block 502 in FIG. 5. At block 602, the 8×8 block of G prediction residuals is sub-sampled using 2×2 sub-sampling to produce a 4×4 block of G residuals at block 603. The sub-sampling at block 602 could be, for example, an averaging operation. Alternatively, any low-pass or decimation filtering technique could be used for block 602. At block 604, the 4×4 G residuals together with the 4×4 Blue (B) residuals (block 605) and the 4×4 block of Red (R) residuals (block 606) are converted from RGB-based data to YCoCg-based data. At block 607, the YCoCg data goes through a 4×4 transformation and is quantized at block 608 to produce YCoCg coefficients at block 609. The YCoCg coefficients are coded into bitstreams by an entropy encoder at block 620.

The YCoCg coefficients generated at block 608 are dequantized at block 610 and inverse 4×4 transformed at block 611 to reconstruct the YCoCg-based data before being converted to RGB-based data at block 612 to form a reconstructed 4×4 G residual at block 613. The 4×4 G residual is 2×2 up-sampled at block 614 to form an 8×8 G prediction residual at block 615. The up-sampling process at block 614 could be, for example, a duplicative operation. Alternatively, any interpolation filtering technique could be used for block 614. The differences between the 8×8 G residual at block 601 and the 8×8 G residual prediction at block 615 are used to form the second-level 8×8 G residual at block 616. The second-level 8×8 G residual goes through a transformation at 617 and a quantization process at block 618 to form Green (G) coefficients at block 619. The G coefficients are coded into bitstreams by the entropy coder at block 620.

Figure 7:
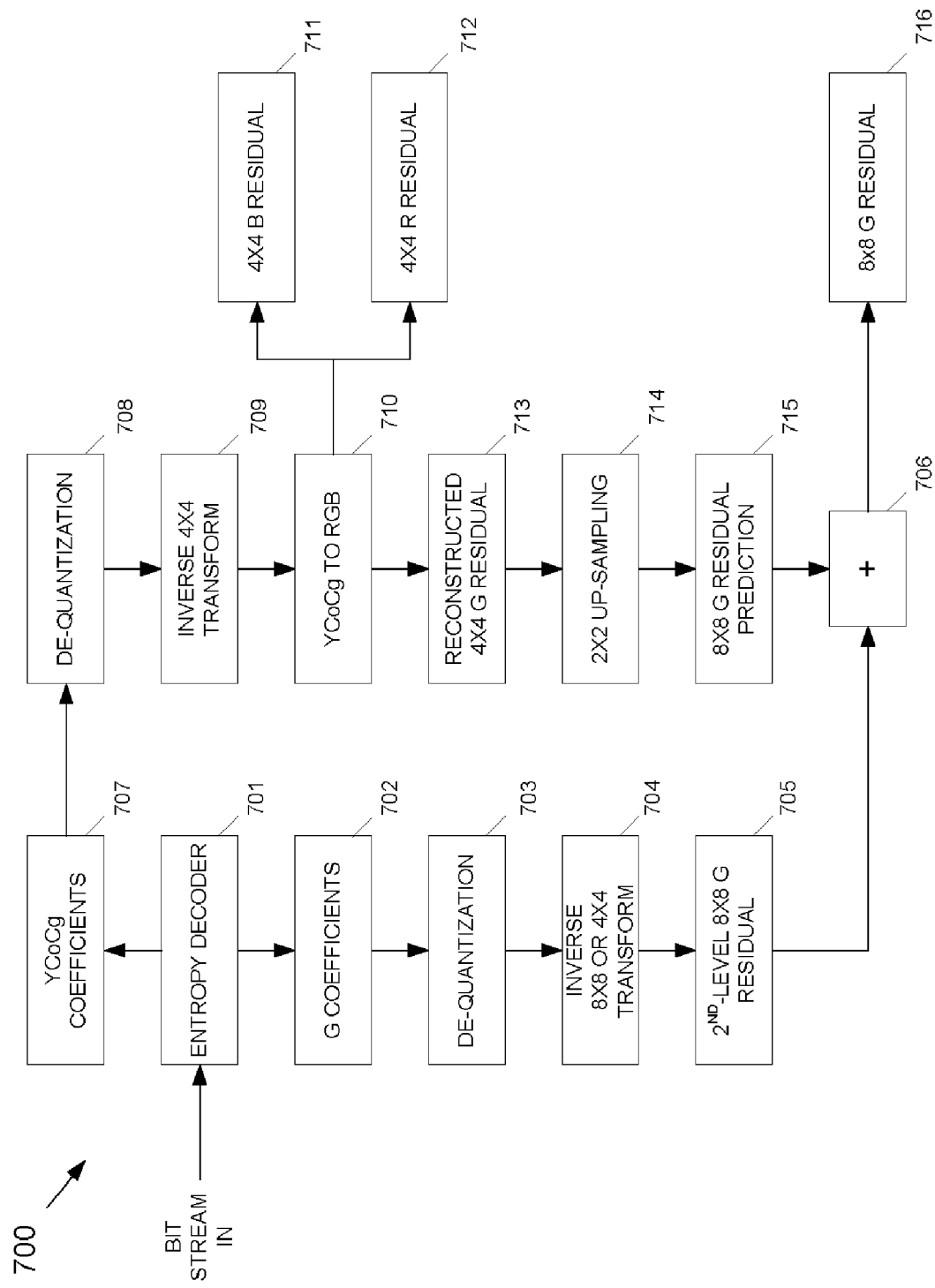
FIG. 7 shows a flow diagram of a residual decoding technique using RCT for 4:2:0 RGB data according to the present invention.

FIG. 7 shows a flow diagram 700 of a residual decoding technique using RCT for 4:2:0 RGB data according to the present invention. A functional block diagram for a residual decoder corresponding to the residual encoding technique of FIG. 7 has not been included because such a block diagram would be nearly identical to FIG. 7. The process depicted in FIG. 7 corresponds only to the residual decoding, including inverse transforms (spatial and RCT), dequantization, and entropy decoding modules. Prediction and motion compensation are done in the raw RGB domain and are not depicted in FIG. 7.

At block 701, a bitstream is entropy decoded by an entropy decoder to form G coefficients at 702 and YCoCg coefficients at 707. The G coefficients are dequantized at 703 and an 8×8 or a 4×4 inverse transform is performed at 704 to form a 2nd-level 8×8 G residual at 705.

The YCoCg coefficients at 707 are dequantized at 708 and 4×4 inverse transformed at 709. At 710 the YCoCg coefficients are transformed to RGB-based data. A reconstructed 4×4 B residual is formed at 711, a reconstructed 4×4 R residual is formed at 712, and a reconstructed 4×4 G residual is formed at 715. The reconstructed 4×4 G residual is up-sampled at 714 to form an 8×8 G residual prediction.

At 706, the two 2nd-level 4×4 G residuals (at 705) are summed with the 8×8 G residual prediction (at 715) to form a reconstructed 8×8 G residuals at 716.

There are several considerations that should be kept in mind when designing a codec for use with the present invention. For example, because the up-sampling process at block 602 and the down-sampling process at block 614 in FIG. 6 are a normative part of a codec, symbols encoded into the bitstream are required at the sequence/picture level so that the correct up-sampling and down-sampling are selected.

Another consideration would be that for coefficient coding, there are four total components that require coding: Y, Co, Cg, and the $2^{nd}$-level G. Separate Quantization Parameter (QP) values should be defined for each of the four components. In particular, the QPs for Y and for the $2^{nd}$-level G could be different. Coded block patterns (cbp) parameters should similarly be defined for each of the four components. Yet another consideration would be that for G intra prediction, 8×8 prediction modes are preferred; while for R/B, 4×4 intra modes could be used for the 4:2:0 format.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A Residual Color Transform (RCT) coding method for 4:2:0 Red-Green-Blue (RGB) data, said method comprising:
   interpolating RGB data to generate at least one missing Green color component to form 4:2:0 RGB data, wherein said interpolating is performed with a device comprising a processor and a memory; and
   directly encoding the 4:2:0 RGB-based data without data loss.

2. The method according to claim 1, wherein said interpolating RGB data includes using a 1:1.5 expansion technique.

3. A Residual Color Transform (RCT) coding method for 4:2:0 Red-Green-Blue (RGB) data, said method comprising:
   interpolating RGB data to generate at least one missing Green color component to form 4:2:0 RGB data, wherein said interpolating is performed with a device comprising a processor and a memory;
   subsampling an 8×8 Green residual to form a single 4×4 Green residual;
converting the 4×4 Green residual, a corresponding 4×4 Red residual and a corresponding 4×4 Blue residual to YCoCg-based data;
   4×4 transforming the YCoCg-based data;
   quantizing the 4×4 transformed YCoCg-based data to form YCoCg coefficients; and
   coding the YCoCg coefficients into a bitstream.

4. The method according to claim 3, wherein coding the YCoCg coefficients into the bitstream further comprises:
   dequantizing the YCoCg coefficients;
   inverse 4×4 transforming the dequantized YCoCg coefficients to reconstruct the YCoCb-based data;
   converting the YCoCg-based data to RGB-based data;
   reconstructing 4×4 G residual data;
   2×2 up-sampling the 4×4 G residual data to form an 8×8 G residual prediction;
   forming a 2nd-level 8×8 Green residual based on a difference between the 8×8 G residual prediction and the 8×8 Green residual;
   transforming the 2nd-level 8×8 Green residuals by one of a 4×4 transformation and an 8×8 transformation;
   quantizing the transformed 2nd-level 8×8 Green residual to form Green coefficients; and
   coding the Green coefficients into the bitstream.

5. The method according to claim 4, further comprising:
   entropy decoding the bitstream to form YCoCg coefficients; de-quantizing the YCoCg coefficients;
   inverse-transforming the de-quantized YCoCg coefficients to form an 8×8 Green residual prediction and 4×4 Red and Blue residuals; and
   forming an 8×8 Green residual from the 8×8 Green residual prediction.

6. The method according to claim 5, wherein said forming the 8×8 Green residual from the 8×8 Green residual prediction comprises:
   entropy decoding the bitstream to form Green coefficients;
   de-quantizing the Green coefficients to form an 8×8 Green residual;
   inverse-transforming the dequantized Green coefficients to form a 2nd-level 8×8 Green residual; and
   combining the 2nd-level 8×8 Green residual with the 8×8 Green residual prediction to form the 8×8 Green residual.

7. The method according to claim 1 further comprising:
   directly decoding the encoded 4:2:0 RGB data; and
   interpolating the decoded 4:2:0 RGB data for generating at least one of a missing Blue color component and a missing Red color component.

8. The method according to claim 7, further comprising displaying the directly decoded and interpolated 4:2:0 RGB data.

9. A video coding system for directly coding 4:2:0 RGB data, said system comprising:
   a. a 4:2:0 coder for directly coding 4:2:0 RGB data using an RCT coding tool by interpolating RGB data to generate at least one missing Green color component to form 4:2:0 RGB data; and
   b. directly encoding the 4:2:0 RGB-based data without data loss;
   c. wherein said 4:2:0 coder comprises a processor and a memory.

10. The system according to claim 9, wherein the system further comprises a 4:2:0 decoder for directly decoding the encoded 4:2:0 RGB data, and interpolating the decoded 4:2:0 RGB data for generating at least one of a missing Blue color component and a missing Red color component, wherein said 4:2:0 decoder comprises a processor and a memory.

11. The system according to claim 10, wherein the system further comprises a display for displaying the directly decoded and interpolated 4:2:0 RGB data.

12. A video coding system for directly coding 4:2:0 RGB data, said system comprising:
   a 4:2:0 coder for directly coding 4:2:0 RGB data using an RCT coding tool by interpolating RGB data to generate at least one missing Green color component to form 4:2:0 RGB data; and
   directly encoding the 4:2:0 RGB-based data;
   wherein said 4:2:0 coder comprises a processor and a memory;
   a sub-sampler for sub-sampling an 8×8 Green residual to form a single 4×4 Green residual;
   a converter for converting the 4×4 Green residual, a corresponding 4×4 Red residual and a corresponding 4×4 Blue residual to YCoCg-based data;
   a transformer for 4×4 transforming the YCoCg-based data;
   a quantizer for quantizing the 4×4 transformed YCoCg-based data to form YCoCg coefficients; and
   an entropy coder for coding the YCoCg coefficients into a bitstream.

13. The system according to claim 12, further comprising:
   a dequantizer for dequantizing the YCoCg coefficients;
   an inverse transformer for inverse 4×4 transforming the dequantized YCoCg coefficients to reconstruct the YCoCb-based data;
   a converter for converting the YCoCg-based data to RGB-based data;
   a reconstructor for reconstructing 4×4 G residual data;
   an up-sampler for 2×2 up-sampling the 4×4 G residual data to form an 8×8 G residual prediction;
   a differencer for forming a 2nd-level 8×8 Green residuals based on a difference between the 8×8 G residual prediction and the 8×8 Green residuals;
   a second transformer for transforming the 2nd-level 8×8 Green residuals by one of a 4×4 transformation and an 8×8 transformation; and
   a second quantizer for quantizing the transformed 2nd-level 8×8 Green residual to form Green coefficients,
   wherein the entropy coder further codes the Green coefficients into the bitstream.

14. The system according to claim 13, further comprising a decoder, said decoder comprising:

an entropy decoder for decoding the bitstream to form YCoCg coefficients;

a first de-quantizer for de-quantizing the YCoCg coefficients;

a first inverse-transformer for inverse-transforming the de-quantized YCoCg coefficients to form an 8×8 Green residual prediction and 4×4 Red and Blue residuals; and a residual former for forming an 8×8 Green residual from the 8×8 Green residual.

15. The system according to claim 14 wherein the entropy decoder further entropy decodes the bitstream to form Green coefficients, and wherein the residual former comprises:

a second de-quantizer for de-quantizing the Green coefficients to form an 8×8 Green residual;

a second inverse-transformer for inverse-transforming the dequantized Green coefficients to form a 2nd-level 8×8 Green residual; and a combiner for combining the 2nd-level 8×8 Green residual with the 8×8 Green residual prediction to form the 8×8 Green residual.

* * * * *